United States Patent
Jöngren

(10) Patent No.: US 8,311,162 B2
(45) Date of Patent: Nov. 13, 2012

(54) METHOD AND DEVICE FOR INTERFERENCE SUPPRESSION IN USER TERMINAL

(75) Inventor: George Jöngren, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 408 days.

(21) Appl. No.: 12/594,062

(22) PCT Filed: Mar. 19, 2008

(86) PCT No.: PCT/SE2008/050313
§ 371 (c)(1),
(2), (4) Date: Sep. 30, 2009

(87) PCT Pub. No.: WO2008/121054
PCT Pub. Date: Oct. 9, 2008

(65) Prior Publication Data
US 2010/0104037 A1   Apr. 29, 2010

(30) Foreign Application Priority Data
Mar. 30, 2007 (SE) ...................................... 0700857

(51) Int. Cl.
*H04L 27/06* (2006.01)
*H04B 7/06* (2006.01)
*H04B 1/10* (2006.01)
*H04B 1/02* (2006.01)
*H03D 1/04* (2006.01)
(52) U.S. Cl. .......................... 375/340; 375/267; 375/347
(58) Field of Classification Search .................. 375/267, 375/285, 299, 316, 340, 346, 347; 455/101, 455/296
See application file for complete search history.

(56) References Cited

U.S. PATENT DOCUMENTS
| | | | | |
|---|---|---|---|---|
| 6,952,460 | B1 * | 10/2005 | Van Wechel et al. | 375/350 |
| 7,158,579 | B2 * | 1/2007 | Hottinen | 375/267 |
| 2003/0026348 | A1 * | 2/2003 | Llang et al. | 375/267 |

OTHER PUBLICATIONS

Lei Zhang; Shaoqian Li; Hongming Zheng; May Wu, IA Selective Co-Channel Interference Mitigation Method for Alamouti Code, I Computers and Communications, 2006_ISCC 106. Proceedings. 11th IEEE Symposium on Computers and Communications, pp. 149-154, Jun. 26-29, 2006; equation 4, section 3.3.

Atarrouti, Siavash M.; A Simple Transmit Diversity Technique for Wireless Communications; IEEE Journal on Select Areas in Communications, vol. 16. No. 8, Oct. 1998.

Tarokh, Vahid: Space—Time Block Codes from Orthogonal Designs; IEEE Transactions on Information Theory, vol. 45. No. 5, Jul. 1999.

* cited by examiner

*Primary Examiner* — Betsy Deppe

(57) ABSTRACT

A user terminal [12] and method for suppressing interference associated with receiving data, via a wireless channel, from multiple antennas [14, 16] of a transmitter of interest [10]. The user terminal [12] includes an antenna [98] configured to receive an information carrying signal including at least two vectors transmitted from the transmitter of interest [10], and a processor [90] configured to generate first and second vectors, each associated with a corresponding one of the two transmitted vectors, to generate a covariance matrix [R] based on the generated first and second vectors, to process the covariance matrix [R] to have four block elements, the four block elements including first to four matrices, the third matrix being the complex conjugate of the second matrix with opposite sign and the fourth matrix being the complex conjugate of the first matrix, and to jointly decode the first and second vectors based on an inverse of the covariance matrix $[R^{-1}]$, to reproduce the data within the received information carrying signal.

27 Claims, 8 Drawing Sheets

METHOD AND DEVICE FOR INTERFERENCE SUPPRESSION IN USER TERMINAL

RELATED APPLICATION

This application is related to, and claims priority from Swedish Patent Application Serial No. SE 0700857-6, filed on Mar. 20, 2007, entitled "Method and Arrangement in a Telecommunication System" to George Jöngren, the entire disclosure of which is incorporated here by reference.

TECHNICAL FIELD

The present invention generally relates to radio communication systems, user terminals, software and methods and, more particularly, to mechanisms and techniques for fast matrix computation in telecommunication systems with interference suppression capabilities.

BACKGROUND

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

The LTE wireless communication systems would support multiple-input-multiple-output (MIMO) antenna array configurations. The use of multiple antennas at the transmitter and/or the receiver side can significantly boost the performance of a wireless system. Such MIMO arrays of antennas have the potential of both improving data rates as well as increasing the diversity. The antennas in a MIMO configuration can be located relatively far from each other, typically implying a relatively low mutual correlation. Alternatively, the antennas can be located relatively close to each other, typically implying a high mutual correlation. Which correlation is desirable depends on what is to be achieved with the multi-antenna configuration, i.e. transmit diversity or spatial multiplexing. These characteristics of a MIMO communication system are discussed next.

Transmit diversity may be achieved by using multiple antennas at the transmitter side. The use of multiple transmit antennas provides an opportunity for diversity without the need for additional receive antennas and corresponding additional receiver chains at a user terminal. Transmit-antenna diversity, simply referred herein as diversity, is achieved by providing a large distance between the antennas at the transmitter. Different approaches can be pursued to realize the diversity. One such approach, the delay diversity, is illustrated in FIG. 1. In FIG. 1 a signal S is transmitted from a transmitter 10 to a receiver 12, at a first time, via a first antenna 14, and at a second time, later than the first time, via a second antenna 16 of the transmitter, to create artificial time dispersion. A time delay unit 18 introduces a controlled time delay. The delay diversity is "invisible" to the user terminal that includes the receiver 12. The user terminal will simply see a single radio-channel subject to additional time dispersion.

Another approach to achieve diversity is cyclic-delay diversity (CDD). This delay is similar to the delay diversity discussed with regard to FIG. 1 with the difference that cyclic-delay diversity operates block-wise and applies cyclic shifts rather than linear delays as shown for example in FIG. 2. In case of OFDM transmission, as used for example by LTE systems, a cyclic shift of the time-domain signal corresponds to a frequency-dependent phase shift before OFDM modulation, as illustrated for example in FIG. 3. Similar to delay diversity, this delay creates artificial frequency selectivity as seen by the receiver.

Still another approach to achieve transmit diversity is space-time coding. Space-time coding is a general term used to indicate multi-antenna transmission schemes where modulation symbols are mapped in the time and spatial domain to capture the diversity offered by the multiple transmit antenna. As shown in FIG. 4, a space-time transmit diversity (STTD) unit 19 operates on pairs of modulation symbols. The modulation symbols $s_0$, $s_1$, $s_2$, and $s_3$ are directly transmitted to the first antenna 14 while at the second antenna 16, the order of the modulation symbols within a pair is reversed, in addition to some sign changes and complex conjugate operations, as shown in FIG. 4. Optionally, the modulation symbols are sign-reversed and complex-conjugated as also shown in FIG. 4. An approach similar to the space-time coding is the space-frequency block coding (SFBC). The difference is that the encoding in SFBC is carried out in the antenna/frequency domain rather than in the antenna/time domain. Thus, space-frequency coding is easily applicable to OFDM and other "frequency-domain" transmission schemes. As shown in FIG. 5, the space-frequency transmit diversity (SFTD) maps a block of modulation symbols $a_0$, $a_1$, $a_2$, $a_3$, ... to OFDM carriers of the first antenna 14, while the block of symbols $-a_1^*$, $a_0^*$, $-a_3^*$, $a_2^*$, ... is mapped to corresponding subcarriers of the second antenna 16.

Spatial multiplexing is another characteristic of MIMO systems. Spatial multiplexing is achieved by using multiple antennas at both the transmitter and receiver as will be discussed next. The simultaneous availability of multiple antennas at the transmitter and the receiver can be used to create multiple parallel "data pipes" over the radio interface. This provides the possibility for high bandwidth utilization without a corresponding reduction in power efficiency. i.e., the possibility of high data rates within a limited bandwidth. This mechanism is known as spatial multiplexing. For example, considering a 2 by 2 antenna configuration, i.e., two transmit (Tx) antennas 14 and 16 and two receive (Rx) antennas 14' and 16' as shown in FIG. 6, and assuming that transmitted signals $s_1$ and $s_2$ are only subject to non-frequency-selective fading and white noise, the signal r (a bold symbol is understood to represent a vector) received at the receiver is described by:

$$r = \begin{pmatrix} r_1 \\ r_2 \end{pmatrix} = \begin{pmatrix} h_{1,1} & h_{1,2} \\ h_{2,1} & h_{2,2} \end{pmatrix} \cdot \begin{pmatrix} s_1 \\ s_2 \end{pmatrix} + \begin{pmatrix} e_1 \\ e_2 \end{pmatrix} = Hs + e,$$

where H is the channel matrix and e represents the noise. In order for the receiver to be able to recover both signals $s_1$ and $s_2$, the H matrix should be invertible. Thus, the receiver calculates the inverse of H as exemplified by the following equation:

$$\begin{pmatrix} \hat{s}_1 \\ \hat{s}_2 \end{pmatrix} = W \cdot r = \begin{pmatrix} s_1 \\ s_2 \end{pmatrix} + H^{-1} \cdot e,$$

where W is the inverse of H and $\hat{s}$ is an estimate of the transmitted symbols at the receiver.

For systems in which a large amount of data is exchanged between transmitters and receivers, the receivers have to perform intense computational tasks for inverting a corresponding channel matrix H, which requires either expensive or bulky equipment at the receiver or a reduction in the exchanged data. Given the fact that the receiver is in some situations a mobile terminal, i.e., a cellular phone or other device capable of exchanging data with a base station, it is difficult to add computational power to the receiver without increasing the size and the cost of the receiver. Therefore, multi-antenna techniques can significantly increase the data rates and reliability of a wireless communication system but also require increased computational powers.

Accordingly, it would be desirable to provide methods, receivers and software for the receivers that would avoid the afore-described problems and drawbacks.

SUMMARY

According to an exemplary embodiment, there is a method for suppressing interference associated with receiving data, via a wireless channel at a receiving unit, from multiple antennas of a transmitter of interest. The method includes receiving an information carrying signal including at least two vectors transmitted from the transmitter of interest; generating first and second vectors, each associated with a corresponding one of the two transmitted vectors; generating a covariance matrix based on the generated first and second vectors: processing the covariance matrix to have four block elements, the four block elements including first to four matrices, the third matrix being the complex conjugate of the second matrix with opposite sign and the fourth matrix being the complex conjugate of the first matrix; and jointly decoding the first and second vectors based on an inverse of the covariance matrix, to reproduce the data within the received information carrying signal.

According to another exemplary embodiment, there is a user terminal for suppressing interference associated with receiving data, via a wireless channel, from multiple antennas of a transmitter of interest. The user terminal includes an antenna configured to receive an information carrying signal including at least two vectors transmitted from the transmitter of interest; and a processor configured to generate first and second vectors, each associated with a corresponding one of the two transmitted vectors, to generate a covariance matrix based on the generated first and second vectors, to process the covariance matrix to have four block elements, the four block elements including first to four matrices, the third matrix being the complex conjugate of the second matrix with opposite sign and the fourth matrix being the complex conjugate of the first matrix, and to jointly decode the first and second vectors based on an inverse of the covariance matrix, to reproduce the data within the received information carrying signal.

According to another exemplary embodiment, a computer readable medium stores computer executable instructions, where the instructions, when executed by a processor that is part of a user terminal, cause the processor to perform a method for suppressing interference associated with receiving data, via a wireless channel at a receiving unit, from multiple antennas of a transmitter of interest. The method includes receiving an information carrying signal including at least two vectors transmitted from the transmitter of interest; generating first and second vectors, each associated with a corresponding one of the two transmitted vectors; generating a covariance matrix based on the generated first and second vectors; processing the covariance matrix to have four block elements, the four block elements including first to four matrices, the third matrix being the complex conjugate of the second matrix with opposite sign and the fourth matrix being the complex conjugate of the first matrix; and jointly decoding the first and second vectors based on an inverse of the covariance matrix, to reproduce the data within the received information carrying signal.

DETAILED DESCRIPTION

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The following exemplary embodiments are described in the context of an LTE system. However, the general principles and methods of the exemplary embodiments are also applicable to other communication systems, e.g. Wideband Code Division Multiple Access (WCDMA), Code Division Multiple Access (CDMA), Worldwide Interoperability for Microwave Access (WiMax). etc. as will be appreciated by those skilled in the art. In an exemplary embodiment illustrated in FIG. 7, it is assumed that a base station 10 includes a transmitting unit and the user terminal 12 includes a receiving unit. The base station 10 may include $N_T$ antenna ports and the receiver may include $N_R$ antennas.

The term "base station" is used in the following as a generic term. As it is known, in the WCDMA architecture, a NodeB may correspond to the base station. In other words, a base station is a possible implementation of the NodeB. However, the NodeB is broader than the conventional base station. Although conventionally the term "base station" is narrower than the NodeB of the WCDMA architecture or the eNodeB of the LTE architecture, the term "base station" is used in the following embodiments as defining the NodeB, eNodeB or other nodes specific for other architectures. Thus, the term "base station" defined and used in the present disclosure is not limited to the conventional base station unit of a network.

Figure 1:
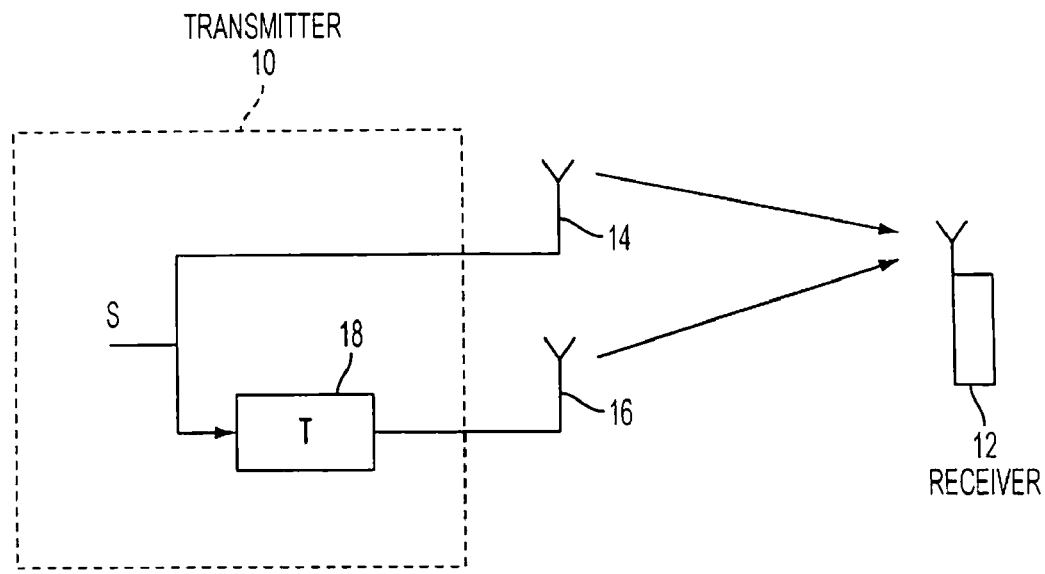
FIG. 1 is a schematic diagram of a transmitter communicating with a receiver while delay diversity is applied to a transmitted signal.
Figure 2:
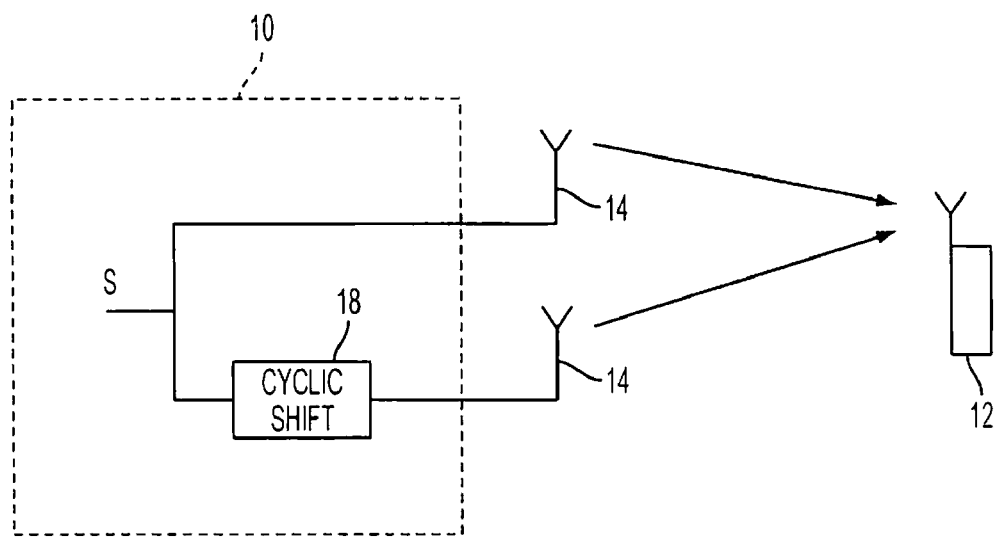
FIG. 2 is a schematic diagram of the transmitter communicating with the receiver while cyclic shift diversity is applied to the transmitted signal.
Figure 3:
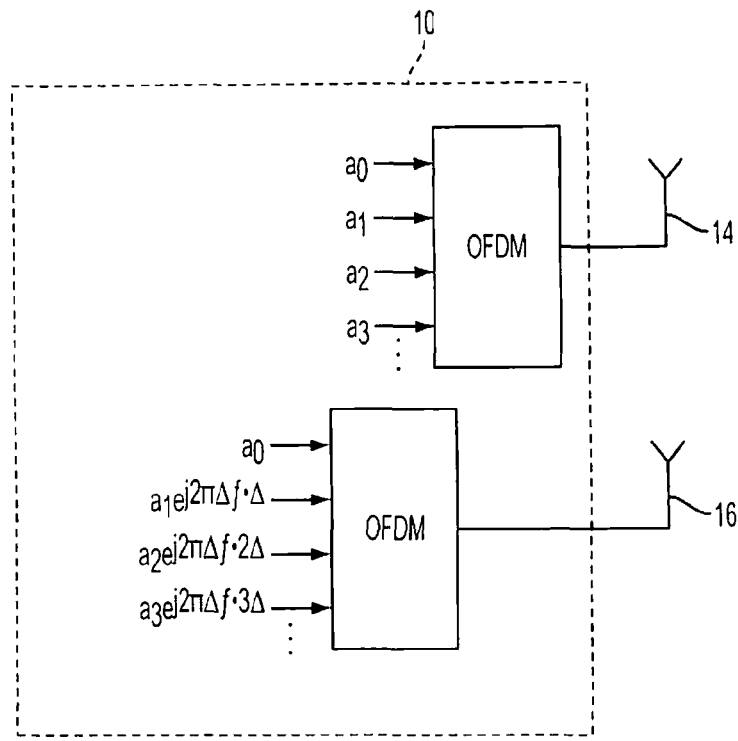
FIG. 3 is a schematic diagram of the transmitter communicating with the receiver while cyclic shift is applied to the transmitted signal.
Figure 4:
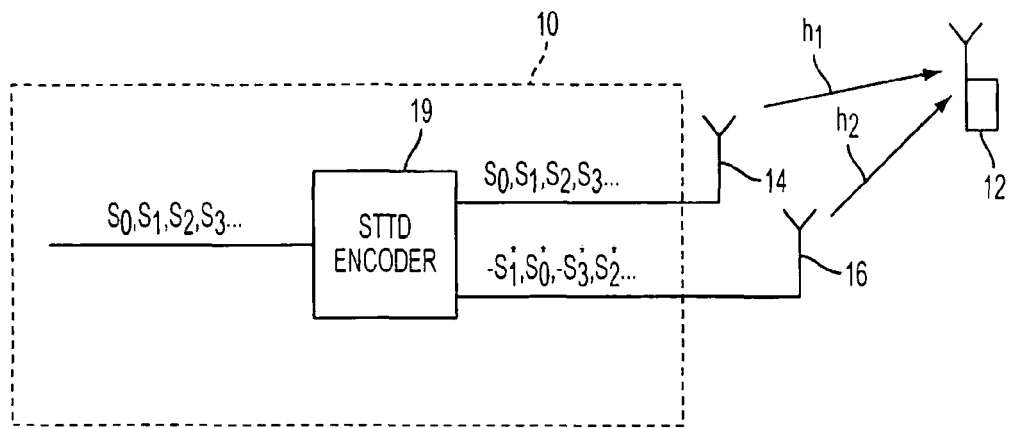
FIG. 4 is a schematic diagram of the transmitter communicating with the receiver while space-time coding is applied to the transmitted signal.
Figure 5:
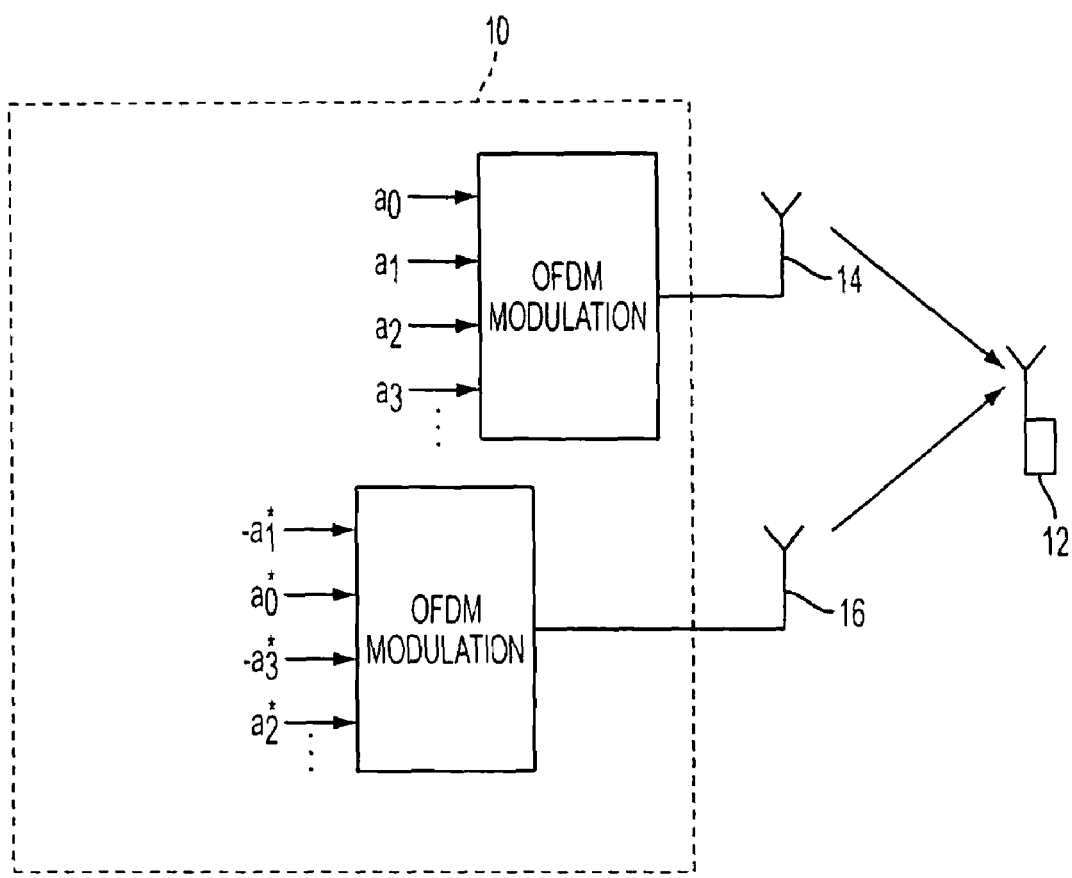
FIG. 5 is a schematic diagram of the transmitter communicating with the receiver while space-frequency coding is applied to the transmitted signal.
Figure 6:
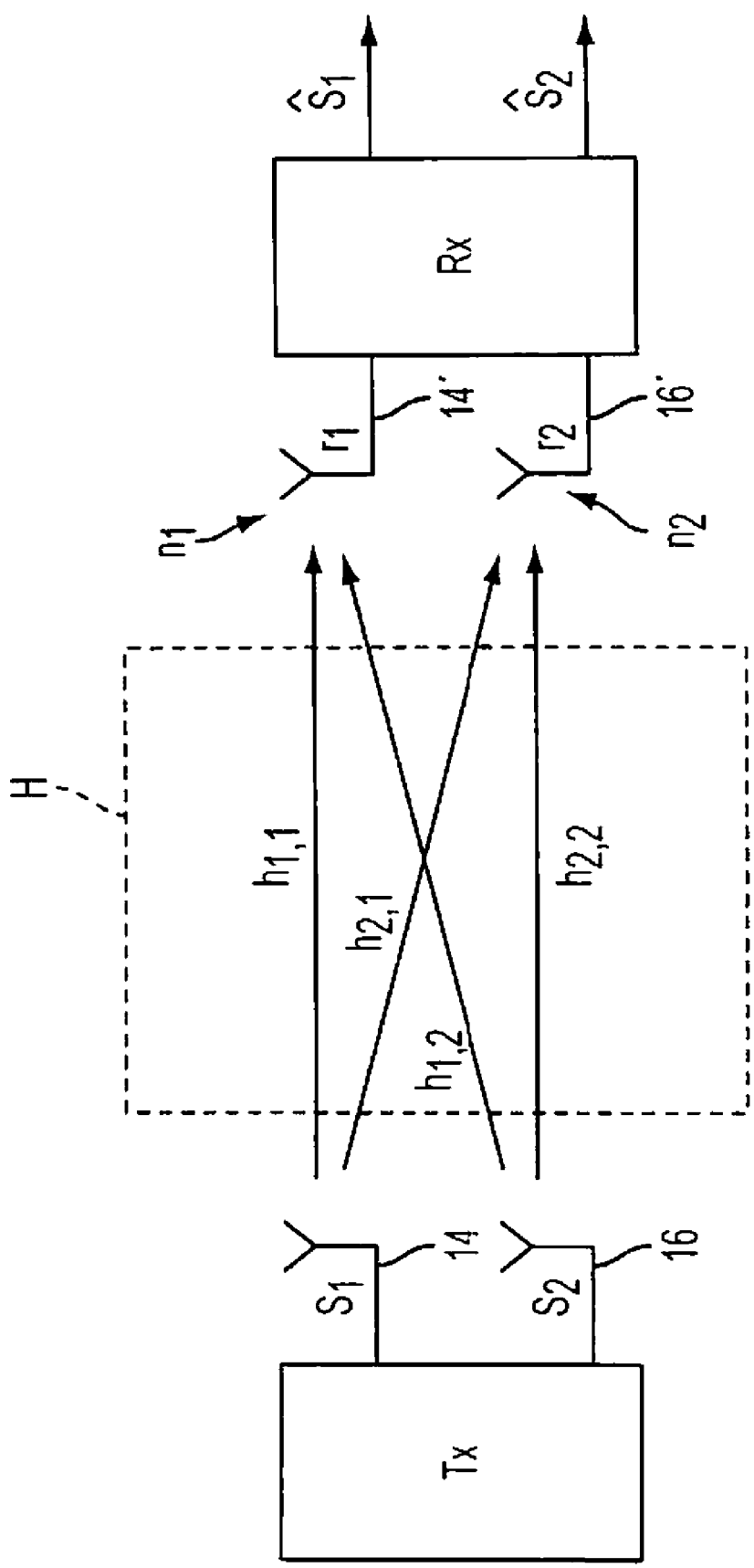
FIG. 6 is a schematic diagram of a communication system that includes two transmitting antennas and two receiving antennas according to one exemplary embodiment.
Figure 7:
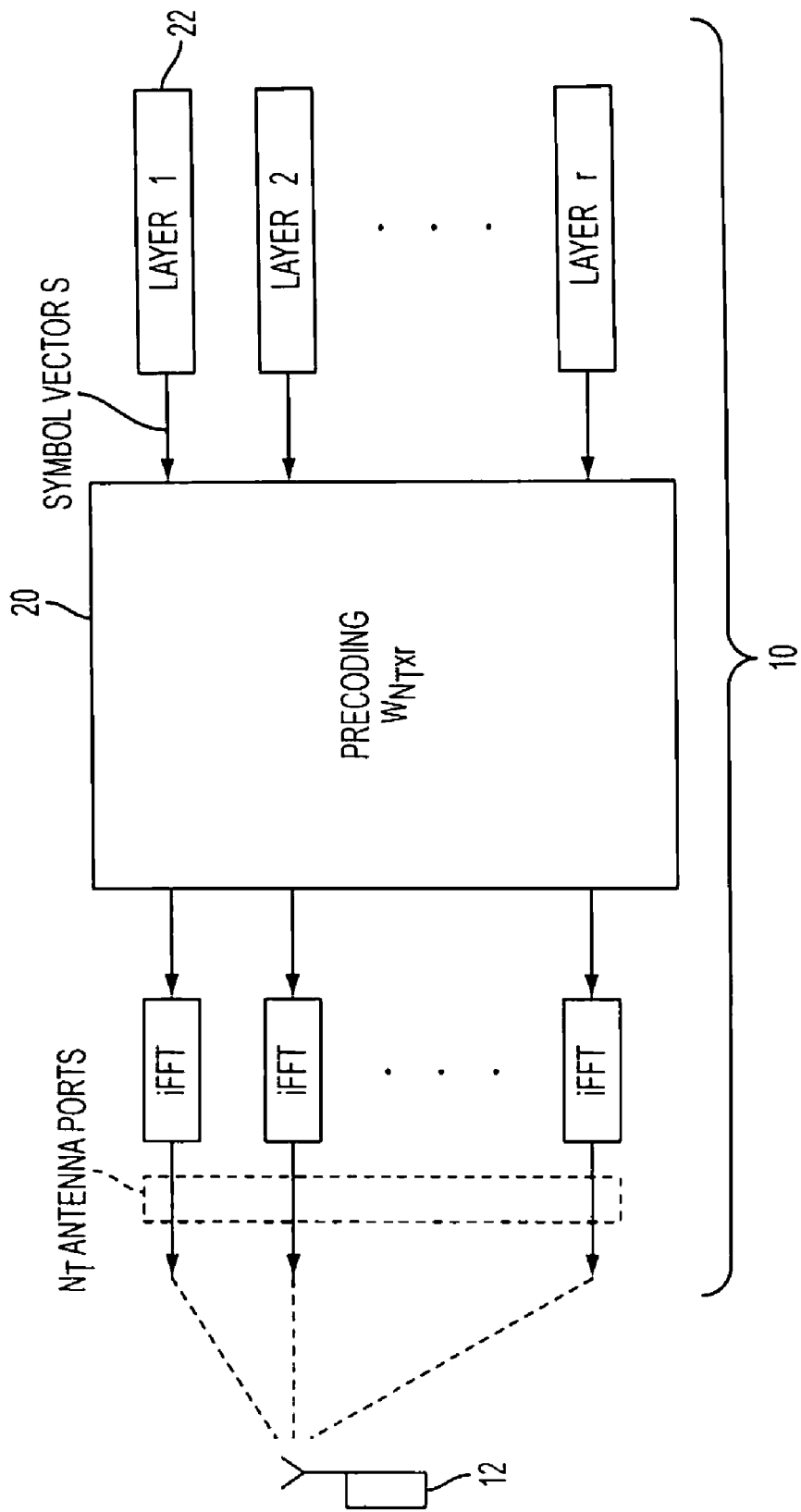
FIG. 7 is a schematic diagram of a base station and illustrates the transmission structure of precoded spatial multiplexing mode in LTE according to one exemplary embodiment.

The system shown in FIG. 7 is assumed to support spatial multiplexing and transmit diversity, which where previously discussed. The IFFT operations symbolize the use of OFDM like transmission. The spatial multiplexing is aimed for high data rates in favorable channel conditions while the diversity is aimed for robustness and reliability in situations in which the conditions are not favorable, e.g., high mobility situations of the user terminal. The information carrying symbol vector s, which is to be transmitted from the base station 10 to the user terminal 12, as shown in FIG. 7, is multiplied by an $N_T \times r$ matrix $W_{N_T \times r}$ in the precoding unit 20. This matrix may be chosen to match the characteristics of the $N_R \times N_T$ MIMO channel H. Each of the r symbols in s corresponds to a symbol stream, also referred to as a layer 22 and r is often referred to as the transmission rank. If the user terminal 12 uses OFDM, the received $N_R \times 1$ vector $y_k$ for a certain resource element on subcarrier k, assuming no inter-cell interference, can be modeled by $$y_k = HW_{N_T \times r} s_k + e_k \quad (1)$$

where $e_k$ is a noise vector and is considered to be random over the subcarriers. Note that in this framework, transmitting with a single layer, i.e., r=1, is considered a special case of spatial multiplexing, although spatial multiplexing is often targeting multi-layer transmission.

When the coding used for encoding the signals to be transmitted is considered, the complexity of the calculations to be performed by the user terminal is increased. In this regard, in one exemplary embodiment, SFBC is used for coding the information to be transmitted. SFBC uses the Alamouti code (e.g. M. Alamouti. "A simple transmit diversity technique for wireless communications," IEEE Journal on Selected Areas in Communications, October 1998, p. 1451-1458, the entire content of which is incorporated here by reference) to spread the information over the antenna ports as well in the frequency domain. SFBC may also include a whole class of so-called orthogonal space-frequency (space-time) block codes with similar properties as the Alamouti code. These codes encode the constituent symbols in an orthogonal manner, thereby facilitating low-complexity maximum likelihood decoding at the receiver assuming spatially and temporally white noise (e.g. Tarokh et al. "Space-Time block codes from orthogonal designs," IEEE Transactions on Information Theory, July 1999, the entire content of which is incorporated here by reference).

For two transmit antennas, SFBC takes two information carrying symbols $s_k$ and $s_{k+1}$ at a time as input and distributes these symbols over frequency and space as described by the codeword matrix $$\begin{bmatrix} s_k & s_{k+1}^c \\ s_{k+1} & -s_k^c \end{bmatrix}, \quad (2)$$

where the rows of the codeword matrix correspond to the different antenna ports, the columns correspond to the subcarrier dimension, and $(\ )^c$ denotes the complex conjugate mathematical operation. In one exemplary embodiment, two consecutive subcarriers are chosen and, without loss of generality, this scenario is used for the remaining embodiments for simplicity, although is should be noted that the block coding is in general two-dimensional and the second dimension may equally well represent time as opposed to frequency (subcarriers). The representation of the Alamouti based SFBC matrix is optional and other exemplary embodiments can use non-Alamouti matrices. The non-Alamouti matrix can, for example, be transposed and conjugated in various ways, as well as precoded with a unitary matrix and the result would still be an equivalent Alamouti based SFBC codeword. Even if such transformed SFBC is used, similar results as discussed in the exemplary embodiments can be obtained.

A related alternative to SFBC is STBC. In STBC, the frequency dimension is replaced by the time dimension and in LTE systems for example, the time dimension would likely correspond to consecutive OFDM symbols. It should also be noted that the concept of SFBC (or also STBC) can be generalized to more than two Tx antennas and that combinations of SFBC (STBC) and other techniques such as Frequency Switched Transmit Diversity (FSTD) or CDD may also be used for larger transmit antenna arrays.

Figure 8:
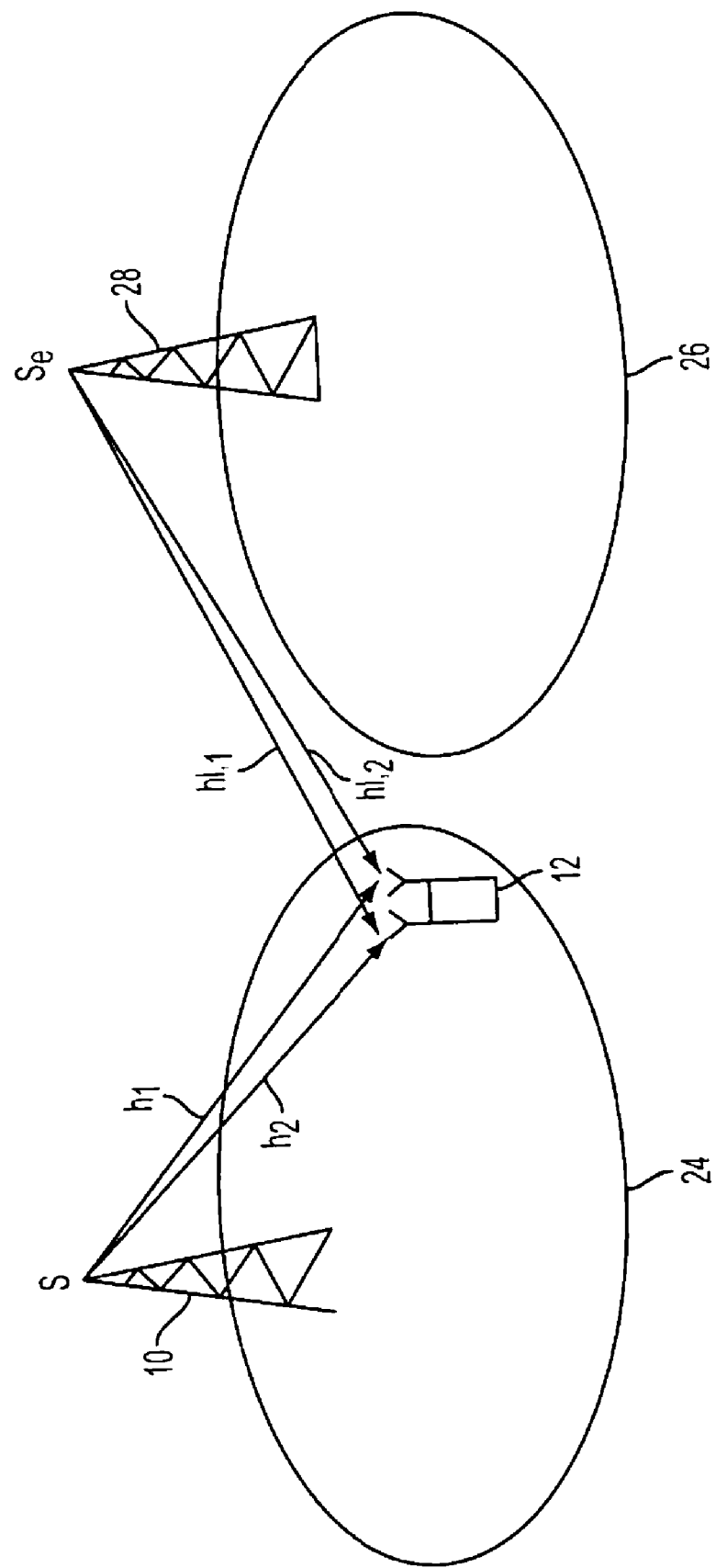
FIG. 8 is a schematic diagram of a user terminal receiving signals from two base stations, where one base station corresponds to the transmitter of interest while the other is not of interest to the user terminal and hence is considered interference, located in adjacent cells in a communication network according to one exemplary embodiment.

The complexity of the calculation to be performed by the user terminal is further increased when inter-cell interference is considered. The inter-cell interference is discussed next. For illustrative purposes, consider an exemplary embodiment that includes a 2 Tx antenna setup. At least two vectors are transmitted from a transmitter of interest in an information carrying signal. The two vectors may correspond to a transmission of a two-dimensional block code, which may be a space-frequency or a space-time block code. These codes may correspond to transmit diversity or to two spatial multiplexing transmissions. The at least two vectors are received at the receiver and may correspond to two consecutive subcarriers. The first and second vectors may each include a first part associated with the transmitter of interest, a second part associated with interference associated with transmitters not of interest, and a third part associated with noise and modeling errors. The received two vectors determine the received matrix Y as being $$Y = [y_k \ y_{k+1}] = H \begin{bmatrix} s_k & s_{k+1}^c \\ s_{k+1} & -s_k^c \end{bmatrix} + [e_k \ e_{k+1}], \quad (3)$$

where it has been assumed that the channel remains constant over the two relevant subcarriers. When a single frequency network is used, the inter-cell interference disturbs a communication link of interest. Inter-cell interference is illustrated in FIG. 8, in which two cells 24 and 26 are shown adjacent to each other. The user terminal 12 receives signals from the base station 10 of cell 24, in which the user terminal is present. However, the user terminal 12 may also receive signals from the base station 28, which corresponds to the adjacent cell 26. This phenomenon of receiving signals from both the base station of the cell in which the user terminal is present (i.e., from the base station of interest) and from a base station of a cell in which the user terminal is not present (corresponding to a transmitter that is not of interest) is called inter-cell interference. This interference will have different spatial signatures depending on the type of transmission (i.e. transmission mode) and depending on which transmission rank is used on the relevant resource elements in interfering cells.

The user terminal may be faced with interference that simultaneously originates from both the transmit diversity mode and the spatial multiplexing mode. Hence, the two received vectors, obtained from subcarriers aligned with the SFBC transmission, can be modeled by combining the two previous received vector expressions (2) and (3) to arrive at $$Y = [y_k \ y_{k+1}] = \quad (4)$$
$$\sum_l H_l [s_{k,l} \ s_{k+1,l}] + \sum_m H_m \begin{bmatrix} s_{k,m} & s_{k+1,m}^c \\ s_{k+1,m} & -s_{k,m}^c \end{bmatrix} + [e_k \ e_{k+1}]$$

The terms in the first sum correspond to spatial multiplexing transmissions from various cells whereas the second sum describes the SFBC transmissions. The channel dependent precoder for the l-th spatial multiplexing user has been absorbed into an equivalent $N_R \times r$ MIMO channel matrix $H_l$ and it has been assumed that the same transmission rank is used for the two subcarriers. Similarly, the MIMO channel $H_m$ for the m-th SFBC user may include a precoder part.

Due to the inter-cell interference, the conventional telecommunication systems and user terminals experience the following problems. If the inter-cell interference is ignored, the user terminal in spatial multiplexing mode would normally demodulate each corresponding subcarrier individually, based on equation (1). Likewise, an SFBC configured user terminal would decode the subcarriers based on the model described in equation (3). However, when strong inter-cell interference is present, the support of interference rejection combining (IRC) in the user terminal may be used to maximize performance. Performing IRC separately on a single subcarrier basis is however, impaired by the presence of SFBC transmissions which appears as rank-two transmissions and thus, cannot be cancelled by an user terminal having $N_R=2$ antennas. Therefore, the quality of decoded signals at the conventional user terminals may be poor, especially for those user terminals that use SFBC or STBC transmission modes.

The following exemplary embodiments describe a method and a mechanism for interference suppression that also reduces the interference associated with SFBC or STBC based transmission modes. The latter transmission mode includes schemes such as SFBC+FSTD or SFBC+CDD or SFBC+PSD, where PSD stands for phase shift diversity. Furthermore, the IRC method described in the following exemplary embodiments is exploiting the structure of the interference for improving estimation accuracy as well as obtaining a low complexity receiver algorithm. According to an exemplary embodiment, the IRC may be a receive-antenna combining method that suppresses specific interferers by using complex weight factors applied to the received signals. This structure can, in addition, also be exploited to improve the accuracy and lower the complexity of channel quality indication (CQI) estimation. Having discussed the tools necessary to understand the interference rejection for STBC transmission, a more specific exemplary embodiment is discussed next.

According to this exemplary embodiment, the user terminal receives the vectors according to equation (4), corresponding to the two relevant subcarriers. Depending whether the user terminal decodes a block coded or a spatial multiplexing transmission, one of the two sums includes a term corresponding to the transmitted signal of interest and the other remaining term, including the other sum, corresponds to interference plus noise. The received vectors can be rewritten as $$Y = [y_k \ y_{k+1}] = \quad (5)$$
$$\sum_l H_l [s_{k,l} \ s_{k+1,l}] + \sum_m [h_{1,m} \ h_{2,m}] \cdot \begin{bmatrix} s_{k,m} & s_{k,m}^c \\ s_{k,m} & -s_{k,m}^c \end{bmatrix} + [e_k \ e_{k+1}]$$

from which the following vectorized model (6) can be obtained:

$$\begin{bmatrix} y_k \\ y_{k+1}^c \end{bmatrix} = \quad (6)$$
$$\sum_l \begin{bmatrix} H_l & 0 \\ 0 & H_l^c \end{bmatrix} \cdot \begin{bmatrix} s_{k,l} \\ s_{k+1,l}^c \end{bmatrix} + \sum_m \begin{bmatrix} h_{1,m} & h_{2,m} \\ -h_{2,m}^c & h_{1,m}^c \end{bmatrix} \cdot \begin{bmatrix} s_{k,m} \\ s_{k,m}^c \end{bmatrix} + \begin{bmatrix} e_k \\ e_{k+1}^c \end{bmatrix}.$$

The complex conjugate operation is motivated by the presence of the complex conjugate operation in the SFBC terms.

Most IRC algorithms rely on inverting a matrix describing the covariance of either the data part of interest plus the interference or of only the interference. Since both possibilities result in similar structures, only the calculation of the covariance in the former case is presented in the following exemplary embodiment. As will be described next, the user terminal of the present exemplary embodiment is configured to calculate in a shorter time interval than a conventional user terminal the inverse of the covariance that is needed for removing or correcting the interference. This advantage of the novel user terminal disclosed in this exemplary embodiment is achieved in part by processing the covariance matrix to have a specific structure. Prior to discussing the covariance matrix and its structure, a possible structure of the user terminal is discussed next.

Figure 9:
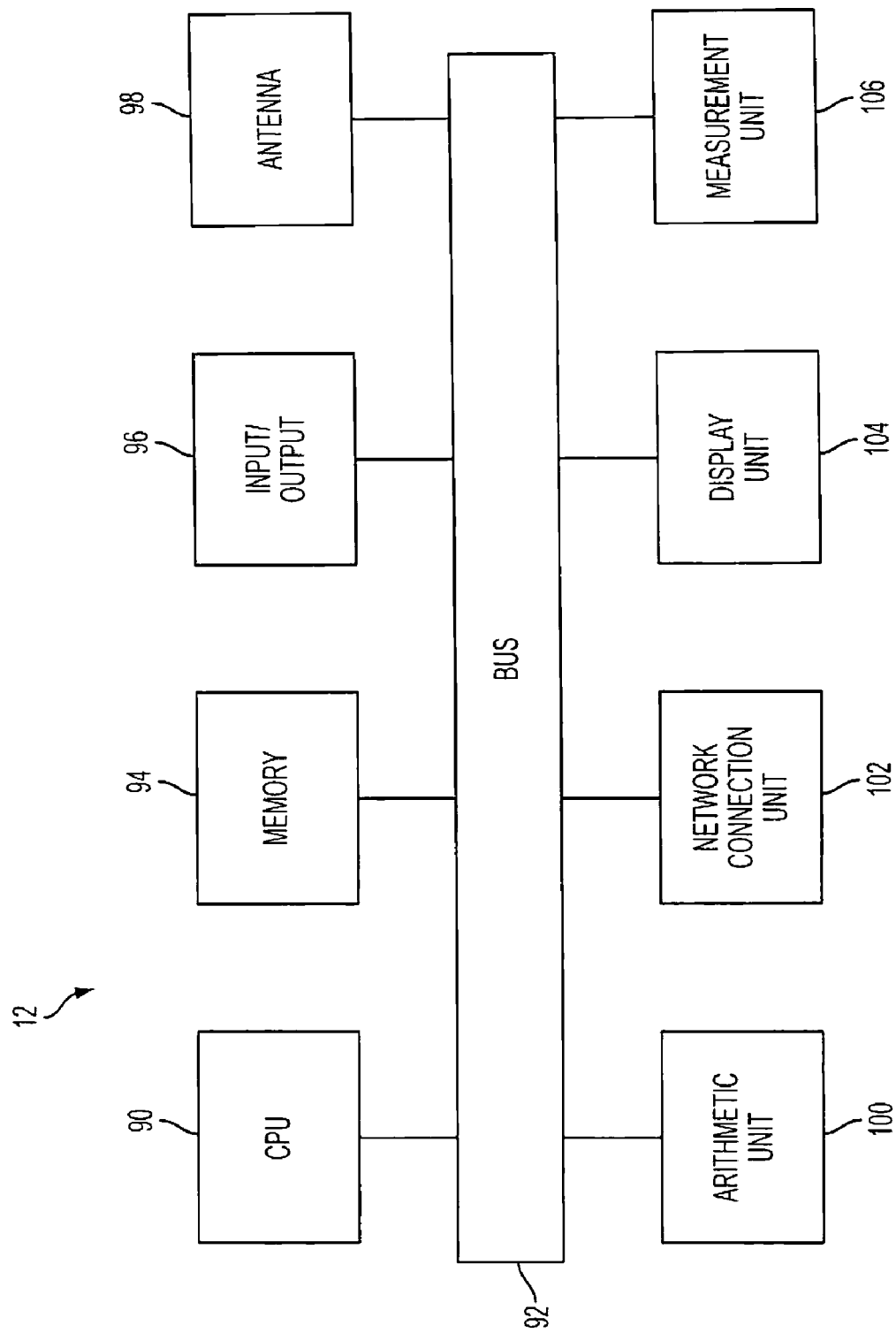
FIG. 9 is a schematic diagram of the user terminal according to one exemplary embodiment.

The possible structure of the user terminal is shown in FIG. 9. The covariance matrix could be calculated by this user terminal or other user terminals as would be appreciated by one skilled in the art. The user terminal may include a CPU 90 that communicates via a bus 92 with a memory 94. The CPU 90 can ensure the functionality of the components of the user terminal and also retrieves and stores data from the memory 94. Memory 94 can be a permanent memory, a temporary memory, or a mixture of the previous two possibilities. The user terminal also includes an input/output unit 96 that provides input data to the CPU 90 and memory 94. An example of the input/output unit 96 is a keyboard, a mouse device, a voice recognition unit, etc. The user terminal may include one or more antenna 98 that might be configured in a MIMO array. Optionally, the user terminal may have an arithmetic unit 100 that is dedicated to performing matrix calculations necessary for the MIMO communications and for the calculation of the covariance matrix and its inverse. The arithmetic unit 100 may be implemented in software, dedicated circuitry or a combination thereof. If no arithmetic unit is present, then the CPU may perform the functions of this unit. The user terminal also may include a network connection unit 102 to connect to an existing network, either wireless or through a wire. A display unit 104 may be connected to the bus 92 to display various data of the user terminal. A measurement unit 106 may be added for the purpose of measuring a quality of a received/transmitted signal or other parameters depending on the usage of the user terminal. In this respect, examples of user terminals are a mobile phone, a personal digital assistant, a digital camera, a portable computer, etc.

The covariance matrix, which may be calculated by the CPU 90 or the arithmetic unit 100, is formed as shown in (7):

$$R = E\left[\begin{bmatrix} y_k \\ y_{k+1}^c \end{bmatrix} \cdot [y_k^* \quad y_{k+1}^T]\right] \quad (7)$$

$$= \sum_l \begin{bmatrix} H_l & 0 \\ 0 & H_l^c \end{bmatrix} \cdot \begin{bmatrix} H_l & 0 \\ 0 & H_l^c \end{bmatrix}^* +$$

$$\sum_m \begin{bmatrix} h_{1,m} & h_{2,m} \\ -h_{2,m}^c & h_{1,m}^c \end{bmatrix} \cdot \begin{bmatrix} h_{1,m} & h_{2,m} \\ -h_{2,m}^c & h_{1,m}^c \end{bmatrix}^* + \begin{bmatrix} R_{ee} & 0 \\ 0 & R_{ee}^c \end{bmatrix}$$

$$= \sum_l \begin{bmatrix} H_l H_l^* & 0 \\ 0 & (H_l H_l^*)^c \end{bmatrix} +$$

$$\sum_m \begin{bmatrix} h_{1,m} h_{1,m}^* + h_{2,m} h_{2,m}^* & h_{2,m} h_{1,m}^T - h_{1,m} h_{2,m}^T \\ h_{1,m}^c h_{2,m}^* - h_{2,m}^c h_{1,m}^* & h_{1,m}^c h_{1,m}^T + h_{2,m}^c h_{2,m}^T \end{bmatrix} + \begin{bmatrix} R_{ee} & 0 \\ 0 & R_{ee}^c \end{bmatrix}$$

$$= \begin{bmatrix} A & B \\ -B^c & A^c \end{bmatrix}.$$

where (8)

$$A = \sum_l H_l H_l^* + \sum_m (h_{1,m} h_{1,m}^* + h_{2,m} h_{2,m}^*) + R_{ee}$$

$$B = \sum_m (h_{2,m} h_{1,m}^T - h_{1,m} h_{2,m}^T).$$

The covariance matrix R is shown in (9) and has a structure that can be used to simplify the computation of an inverse as seen from the inverse of R.

$$R^{-1} = \begin{bmatrix} A & B \\ -B^c & A^c \end{bmatrix}^{-1} \quad (9)$$

$$= \begin{bmatrix} (A + BA^{-c}B^c)^{-1} & -(A + BA^{-c}B^c)^{-1}BA^{-c} \\ (A^c + B^c A^{-1}B)^{-1}B^c A^{-1} & (A^c + B^c A^{-1}B)^{-1} \end{bmatrix}$$

$$= \begin{bmatrix} (A + BA^{-c}B^c)^{-1} & -(A + BA^{-c}B^c)^{-1}BA^{-c} \\ ((A + BA^{-c}B^c)^{-1}BA^{-c})^c & (A + BA^{-c}B^c)^{-c} \end{bmatrix}$$

$$= \begin{bmatrix} X^{-1} & -X^{-1}BA^{-c} \\ (X^{-1}BA^{-c})^c & X^{-c} \end{bmatrix},$$

where $$X = A + BA^{-c}B^c.$$

The inverse of R has the same structure as R itself. Thus, the inverse is structured in the CPU 90 or the arithmetic 100 in a way that can be exploited for complexity computation reduction because there are fewer elements to compute. An analysis of the inverse reveals that instead of inverting the original $2N_R \times 2N_R$ covariance matrix, it is sufficient to invert two $N_R \times N_R$ matrices X and A. Thus, the complexity and computational intensity required for calculating the matrix inversion in the CPU 90 or the arithmetic unit 100 is reduced, as it is known that the difficulty to calculate the inverse of a matrix grows cubically with the matrix size. In other words, the size of the inverse matrix to be calculated according to this exemplary embodiment is reduced by a factor of eight, which makes the user terminal of this embodiment faster than a similar conventional terminal.

The previously computed covariance inverse can be used to perform IRC using, for example, a minimum mean square error (MMSE) type of equalizer. Assuming in one exemplary embodiment that the m-th SFBC transmission is to be demodulated and the first SFBC term corresponds to the transmission of interest, such a receiver would estimate the transmitted symbols based on expression $$\begin{bmatrix} \hat{s}_{1,m} \\ \hat{s}_{2,m} \end{bmatrix} = \begin{bmatrix} h_{1,m} & h_{2,m} \\ -h_{2,m}^c & h_{1,m}^c \end{bmatrix}^* R^{-1} \begin{bmatrix} y_k \\ y_{k+1}^c \end{bmatrix}. \quad (10)$$

For the l-th spatial multiplexing transmission, the corresponding MMSE IRC (11) is given by $$\begin{bmatrix} \hat{s}_{k,l} \\ \hat{s}_{k+1,l}^c \end{bmatrix} = \begin{bmatrix} H_l & 0 \\ 0 & H_l^c \end{bmatrix}^* R^{-1} \begin{bmatrix} y_k \\ y_{k+1}^c \end{bmatrix}. \quad (11)$$

When comparing the complexity of this decoding step of the matrix according to this exemplary embodiment with a reference receiver decoding each subcarrier separately, it is noted that twice as many symbols are now decoded simultaneously compared with the reference receiver. Other similar forms of IRC techniques which also rely on R or on the covariance of only the interference will also benefit from the reduced complexity discussed above according to an exemplary embodiment.

Figure 10:
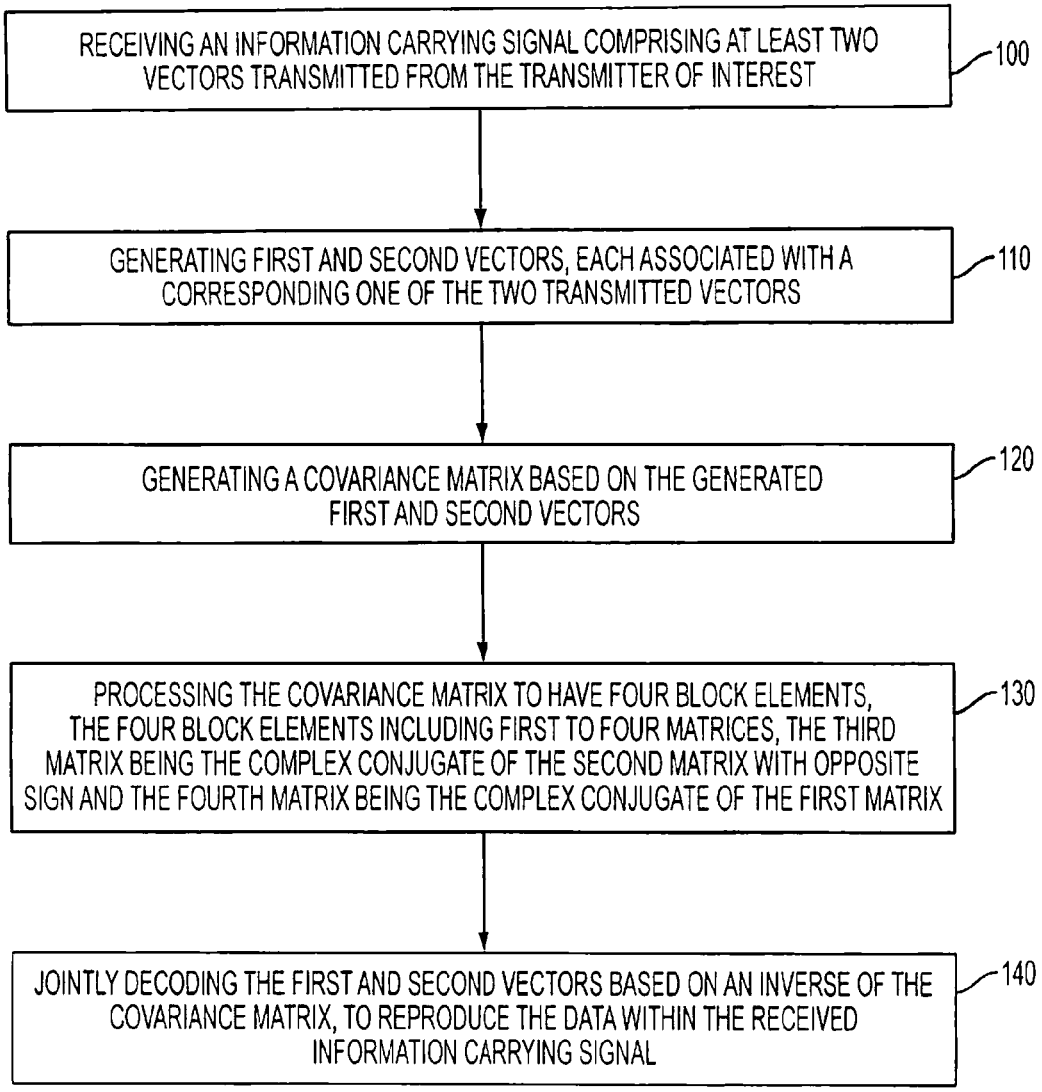
FIG. 10 is a flow chart illustrating the process of calculating the inverse of a covariance matrix according to one exemplary embodiment.

Next, a method for suppressing interference associated with receiving data, via a wireless channel at a receiving unit, from multiple antennas of a transmitter of interest is discussed. The method, illustrated in FIG. 10, includes a step 100 of receiving an information carrying signal including at least two vectors transmitted from the transmitter of interest, a step 110 of generating first and second vectors, each associated with a corresponding one of the two transmitted vectors, a step 120 of generating a covariance matrix based on the generated first and second vectors, a step 130 of processing the covariance matrix to have four block elements, the four block elements including first to four matrices, the third matrix being the complex conjugate of the second matrix with opposite sign and the fourth matrix being the complex conjugate of the first matrix, and a step 140 of jointly decoding the first and second vectors based on an inverse of the covariance matrix, to reproduce the data within the received information carrying signal.

Therefore, the user terminal and communication system described herein includes, according to an embodiment, a receiver structure for implementing IRC to suppress interference for users employing spatial multiplexing as well as SFBC transmission. By jointly considering two subcarriers and taking the structure of the interference into account, a low complexity IRC receiver can be achieved. Such receivers reach sufficient cell-edge throughput in interference limited systems such as LTE.

The reduced matrix complexity is an advantage of the novel user terminals discussed in the exemplary embodiments. This reduced complexity may be achieved when the covariance of the signal of interest plus noise and interference (or just the latter two) can be cast into the matrix structure $$\begin{bmatrix} A & B \\ -B^c & A^c \end{bmatrix}. \quad (12)$$

Inversion of such matrices can, as shown herein, be carried out in a less complex manner. The structure of the covariance can also be exploited to enforce additional constraints to improve estimation of a given quantity. Sample estimates of the covariance may be used as well as more advanced parameterizations of the covariance. Fewer parameters need to be estimated and the estimation accuracy can thus be increased. Further improvements may be made by utilizing the structure for detecting whether the interference is dominated by SFBC type of interference or not. Improved accuracy as well as lower receiver complexity may be obtained.

It should also be pointed out that similar structures arise if the frequency domain is replaced by the time domain. e.g. STTD instead of SFBC. This holds also for combinations involving SFBC, in particular transmission structures such as SFBC+FSTD, SFBC+CDD or SFBC+PSD. The latter are likely candidates for 4 Tx antennas transmit diversity mode in LTE.

These exemplary embodiments provide a user terminal, system, a method and a computer program product for reducing the computational effort of a microprocessor when removing signal interference in a communication system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a user terminal, system, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The invention claimed is:

1. A method for suppressing interference associated with receiving data, via a wireless channel at a receiving unit, from multiple antennas of a transmitter of interest, the method comprising:
   receiving an information carrying signal transmitted in a multi-antenna transmission from the multiple antennas of the transmitter of interest, said multi-antenna transmission corresponding to two vectors of symbols;
   generating first and second vectors, each associated with a corresponding one of the two vectors of symbols;
   forming a covariance matrix (R) based on the generated first and second vectors, which covariance matrix (R) has four block elements, the four block elements including first, second, third, and fourth matrices, the third matrix being a complex conjugate of the second matrix with opposite sign and the fourth matrix being a complex conjugate of the first matrix; and
   jointly decoding the first and second vectors based on an inverse of the formed covariance matrix ($R^{-1}$), to estimate the symbols transmitted in said multi-antenna transmission and to suppress said interference.

2. The method of claim 1, the step of jointly decoding further comprising:
   inverting the covariance matrix, wherein the covariance matrix has a structure:

$$\begin{bmatrix} A & B \\ -B^c & A^c \end{bmatrix},$$

where A and B are two different matrices.

3. The method of claim 2, wherein the step of inverting the covariance matrix comprises:
   inverting matrices X and A, wherein $X=A+BA^{-c}B^c$.

4. The method of claim 2, wherein the structure of the covariance matrix is exploited to improve the accuracy in estimating the covariance.

5. The method of claim 1, wherein the two vectors of symbols correspond to a transmission of a two-dimensional block code.

6. The method of claim 5, wherein the two-dimensional block code is a space-frequency or a space-time block code.

7. The method of claim 6, wherein the two-dimensional block code corresponds to transmit diversity.

8. The method of claim 7, wherein the two-dimensional block code corresponds to space-frequency block coding (SFBC) using two different subcarriers or space-time transmit diversity (STTD) using two different time instants.

9. The method of claim 5, wherein the interference comprises interference from transmissions of transmitters that are now not of interest.

10. The method of claim 1, wherein the two vectors of symbols correspond to two spatial multiplexing transmissions.

11. The method of claim 1, the step of jointly decoding further comprising:
using interference rejection combining (IRC) to decode the first and second vectors.

12. The method of claim 11, wherein the IRC is a receive-antenna combining method that suppresses specific interferers by using complex weight factors applied to the received signals.

13. The method of claim 1, wherein each of the first and second vectors includes a first part associated with the transmitter of interest, a second part associated with interference from transmitters not of interest and a third part associated with noise and modeling errors.

14. A user terminal for suppressing interference associated with receiving data, via a wireless channel, from multiple antennas of a transmitter of interest, the user terminal comprising:
an antenna for receiving an information carrying signal transmitted in a multi-antenna transmission from the multiple antennas, said multi-antenna transmission corresponding to two vectors of symbols; and
a processor for generating first and second vectors, each associated with a corresponding one of the two transmitted vectors of symbols, for forming a covariance matrix (R) based on the generated first and second vectors which covariance matrix has four block elements, the four block elements including first, second, third, and fourth matrices, the third matrix being the complex conjugate of the second matrix with opposite sign and the fourth matrix being the complex conjugate of the first matrix, and for jointly decoding the first and second vectors based on an inverse of the formed covariance matrix ($R^{-1}$), to estimate the symbols transmitted in said multi-antenna transmission and to suppress said interference.

15. The user terminal of claim 14, wherein the processor is further configured to:
invert the covariance matrix, wherein the covariance matrix has a structure:

$$\begin{bmatrix} A & B \\ -B^c & A^c \end{bmatrix},$$

where A and B are two different matrices.

16. The user terminal of claim 15, wherein the processor inverts matrices X and A, wherein $X=A+BA^{-c}B^c$.

17. The user terminal of claim 15, wherein the structure of the covariance is exploited to improve the accuracy in estimating the covariance.

18. The user terminal of claim 14, wherein the two vectors of symbols correspond to a transmission of a two-dimensional block code.

19. The user terminal of claim 18, wherein the two-dimensional block code is a space-frequency or a space-time block code.

20. The user terminal of claim 19, wherein the two-dimensional block code corresponds to transmit diversity.

21. The user terminal of claim 20, wherein the two-dimensional block code corresponds to space-frequency block coding (SFBC) using two different subcarriers or space-time transmit diversity (STTD) using two different time instants.

22. The user terminal of claim 14, wherein the two vectors of symbols correspond to two spatial multiplexing transmissions.

23. The user terminal of claim 14, wherein the interference comprises interference from transmissions of transmitters that are now not of interest.

24. The user terminal of claim 14, wherein the processor uses interference rejection combining (IRC) to decode the first and second vectors.

25. The user terminal of claim 24, wherein the IRC is a receive-antenna combining method that suppresses specific interferers by using complex weight factors applied to the received signals.

26. The user terminal of claim 14, wherein each of the first and second vectors includes a first part associated with the transmitter of interest, a second part associated with interference associated with transmitters not of interest, and a third part associated with noise and modeling errors.

27. A user terminal configured to suppress interference associated with receiving data, via a wireless channel, from multiple antennas of a transmitter of interest, the user terminal comprising:
means for receiving an information carrying signal transmitted in a multi-antenna transmission from the multiple antennas of the transmitter of interest, said multi-antenna transmission corresponding to two vectors of symbols; and
means for generating first and second vectors, each associated with a corresponding one of the two transmitted vectors of symbols, for forming a covariance matrix (R) based on the generated first and second vectors, wherein the covariance matrix has four block elements, the four block elements including first, second, third, and fourth matrices, the third matrix being the complex conjugate of the second matrix with opposite sign and the fourth matrix being the complex conjugate of the first matrix, and for jointly decoding the first and second vectors based on an inverse of the formed covariance matrix ($R^{-1}$), to estimate the symbols transmitted in the multi-antenna transmission and to suppress said interference.

* * * * *

UNITED STATES PATENT AND TRADEMARK OFFICE
CERTIFICATE OF CORRECTION

PATENT NO. : 8,311,162 B2
APPLICATION NO. : 12/594062
DATED : November 13, 2012
INVENTOR(S) : Jongren Page 1 of 1

It is certified that error appears in the above-identified patent and that said Letters Patent is hereby corrected as shown below:

On the Title Page, Item (73), under "Assignee", in Column 1, Line 2, delete "Stockhom" and insert -- Stockholm --, therefor.

On the Title Page, Item (56), under "OTHER PUBLICATIONS", in Column 2, Line 6, delete "Atarrouti," and insert -- Alamouti, --, therefor.

In the Specification

In Column 2, Line 5, delete "i.e." and insert -- i.e., --, therefor.

In Column 2, Line 67, delete "efficiency." and insert -- efficiency, --, therefor.

In Column 4, Lines 58-59, delete "embodiment:" and insert -- embodiment; --, therefor.

In Column 5, Line 42, delete "where" and insert -- were --, therefor.

In Column 6, Line 4, delete "Alamouti." and insert -- Alamouti, --, therefor.

In Column 6, Line 15, delete "et al." and insert -- et al., --, therefor.

In Column 6, Line 35, delete "is" and insert -- it --, therefor.

In Column 7, Line 28, delete "(i.e." and insert -- (i.e., --, therefor.

In Column 9, Line 67, delete "R." and insert -- R, --, therefor.

In Column 11, Line 46, delete "domain." and insert -- domain, --, therefor.

Signed and Sealed this
Twenty-ninth Day of April, 2014

Michelle K. Lee
*Deputy Director of the United States Patent and Trademark Office*